(12) United States Patent
Davis et al.

(10) Patent No.: US 8,054,552 B2
(45) Date of Patent: Nov. 8, 2011

(54) LENS ARRAY ELEMENT AND METHOD

(75) Inventors: Michael T. Davis, Richardson, TX (US); John D. Jackson, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 141 days.

(21) Appl. No.: 12/347,449

(22) Filed: Dec. 31, 2008

(65) Prior Publication Data

US 2010/0165470 A1    Jul. 1, 2010

(51) Int. Cl.
*G02B 27/10* (2006.01)
*G02B 27/14* (2006.01)

(52) U.S. Cl. .................................. 359/626; 359/630

(58) Field of Classification Search .......... 359/626–637, 359/198, 224, 225, 290, 292, 295, 298
See application file for complete search history.

(56) References Cited

U.S. PATENT DOCUMENTS

| 3,267,802 | A | 8/1966 | Noble |
| 6,195,206 | B1 * | 2/2001 | Yona et al. ................. 359/630 |
| 6,807,010 | B2 * | 10/2004 | Kowarz ........................ 359/634 |
| 7,468,843 | B2 * | 12/2008 | Tanijiri et al. .............. 359/631 |
| 7,543,943 | B1 * | 6/2009 | Hubby, Jr. ..................... 353/84 |

* cited by examiner

*Primary Examiner* — Mohammed Hasan
(74) *Attorney, Agent, or Firm* — Warren L. Franz; Wade J. Brady, III; Frederick J. Telecky, Jr.

(57) ABSTRACT

According to one embodiment of the present invention a method for directing light onto a digital micromirror device is disclosed that includes the steps of directing light toward a DMD through a lens that includes a plurality of lens elements such that, absent correction, the directed light is distorted at the DMD; and compensating for the distortion of the directed light at the DMD by predistorting the directed light prior to reaching the DMD by the plurality of lens elements.

11 Claims, 4 Drawing Sheets

LENS ARRAY ELEMENT AND METHOD

TECHNICAL FIELD

This invention relates in general to image display systems, and more particularly to a lens array element and method.

BACKGROUND

Light processing systems often involve directing light towards a display such that an image is produced. One way of effecting such an image is through the use of digital micromirror devices (DMD) available from Texas Instruments. In general, light is directed through a lens array to a DMD array having numerous micro-mirrors. Each lens element in the lens array magnifies light from a light source to cover the active area of the DMD. Each micro-mirror is selectively controlled to reflect the light towards a particular portion of a display, such as a pixel. The angle of a micro-mirror can be changed to switch a pixel to an "on" or "off" state. The micro-mirrors can maintain their "on" or "off" state for controlled display times.

The DMD is often not perpendicular to the axis of the lens array that directs light to it. The DMD is generally at an angle from the axis of the lens array so that light from the lens array can be reflected off of the active area of the DMD towards a target such as a screen or display. This angle between the DMD and the axis of the lens array causes a distortion of the shape of the light on the plane of the DMD. As a result of this distortion, a significant amount of light falls outside the active area of the DMD. This overfill light is lost and does not contribute to image or screen brightness.

SUMMARY

According to one embodiment, a method for directing light onto a digital micromirror device is disclosed that includes the steps of directing light toward a DMD through a lens that includes a plurality of lens elements such that, absent correction, the directed light is distorted at the DMD; and compensating for the distortion of the directed light at the DMD by predistorting the directed light prior to reaching the DMD by the plurality of lens elements.

In another embodiment, a system for compensating for light distortion in a light processing system is disclosed. The system includes a light source; a digital micromirror device; and a lens directing light from the light source to the DMD. The lens includes a plurality of lens elements, wherein each lens element directs light onto the active area of the digital micromirror device in substantially the same shape as the active area of the digital micromirror device.

Certain embodiments may provide a number of technical advantages. For example, a technical advantage of one embodiment may include the capability of delivering more useful light to the active area of the DMD, increasing brightness. Another technical advantage of another embodiment may include increased system efficiency and lower power usage. Other technical advantages of other embodiments may include more uniform image quality or better thermal management properties.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale and do not necessarily contain all optical elements related to the system.

A DMD is a micro electro-mechanical device comprising an array of hundreds of thousands of tilting digital micromirrors. From their flat or resting state, the micro-mirrors may be actively tilted, for example, to a positive or negative angle corresponding to an "on" state and an "off" state. Light from a light source is directed to the DMD's "active area", the area of the DMD containing the digital micromirrors, by a lens system that includes an array of lens elements.

Figure 1:
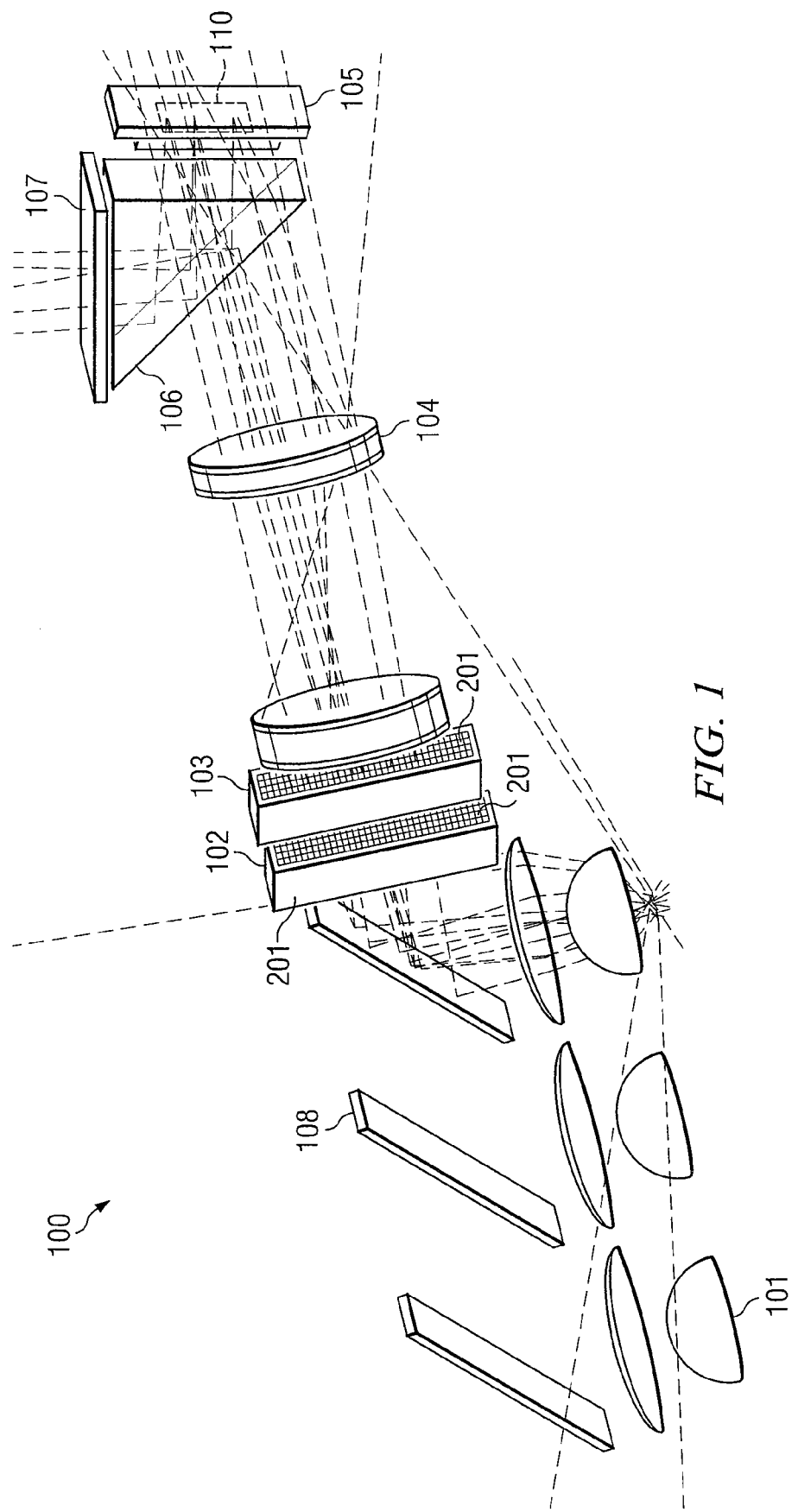
FIG. 1 is a diagram of one embodiment of a portion of a display system.

FIG. 1 is a diagram of one embodiment of a portion of a display system 100 that includes a DMD 105. In this example, system 100 includes a light source 101. Light source 101 includes one or more lamps, LEDs, lasers, or other light sources capable of generating and focusing an illumination light beam. It is generally recognized that display system 100 may include any suitable number of light sources appropriate for generating light for transmission to DMD 105. The system 100 also includes reflecting dichroic mirrors 108, a lens array 102, and a second lens array 103. Lenses 102 and 103 can include a plurality of lens elements. Each lens element magnifies the light through it from light source 101 onto the active area 110 of DMD 105. The system may also include a relay lens system 104, a digital micromirror device 105, a prism 106, and a screen 107.

When the system operates, light from light source 101 is directed to dichroic mirrors 108 and reflected through lens arrays 102 and 103. Additional lenses may also be present between lens arrays 102 and 103 and DMD 105, such as lens 104. Lens arrays 102 and 103 direct light onto the active area 110 of the DMD 105. Light is then reflected off of the active area 110 to a prism 106. Prism 106 directs the light through a projection lens (not shown) to the screen 107. It should be noted that the light from light source 101 reflected off mirrors 108 and magnified and directed through lenses 102 and 103 is transmitted along an axis at an angle to the DMD 105 so that the light can be reflected off of DMD 105 onto the prism 106 and onto the screen 107. This angle is shown as a tilt between the plane of the DMD 105 and the plane of lens array 102 and 103. For DMD's having a mirror tilting angle of +/−12 degrees, the tilt angle of the axis from the lens array to the DMD can be in the range of 24 to 30 degrees. Altogether, FIG. 1 shows a portion of a digital light processing system for creating an illuminated image onto a screen 107.

Figure 2A:
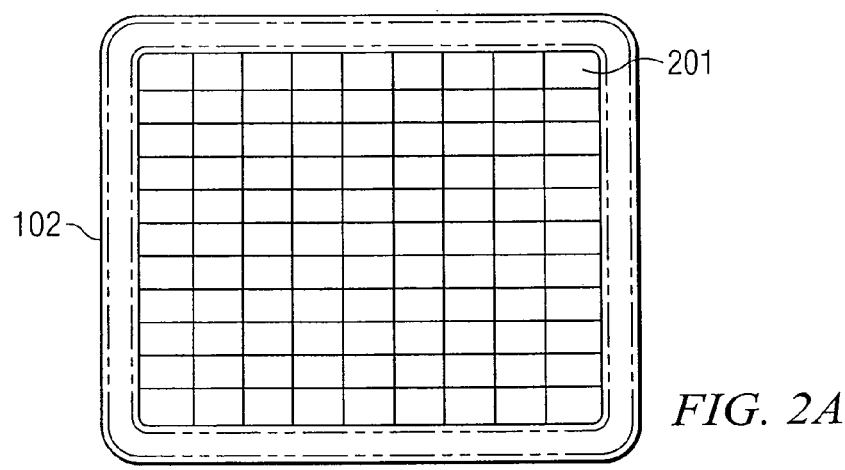
FIG. 2A illustrates an example configuration of a conventional lens with lens elements.
Figure 2B:
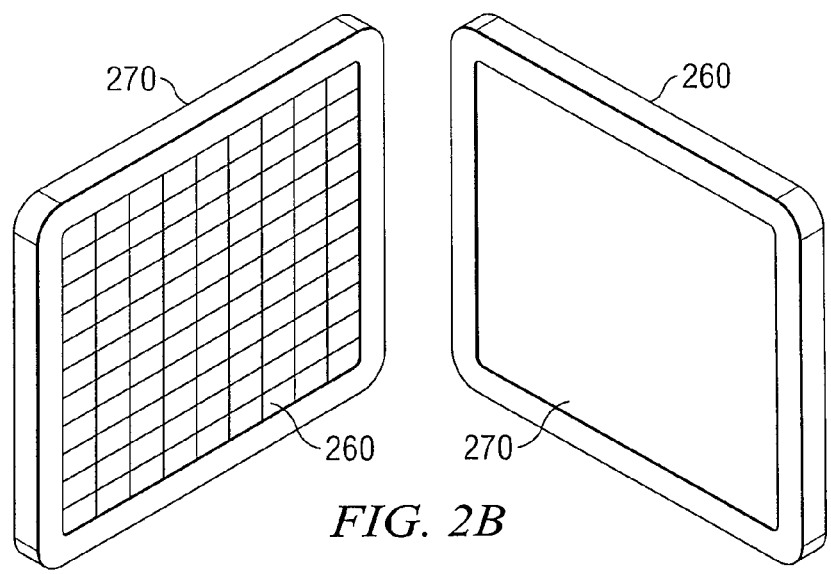
FIG. 2B illustrates an example of the two sides of a lens with lens elements on only one side.
Figure 2C:
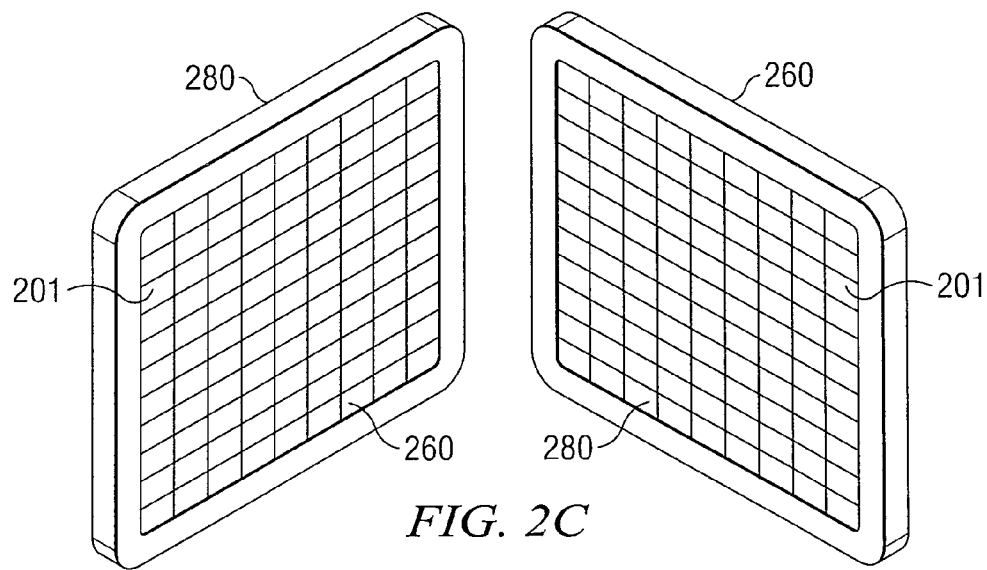
FIG. 2C illustrates an example of the two sides of a lens with lens elements on two sides.

In reference to FIG. 2A, lens arrays 102 and 103 are illustrated from a front view. Lens array 102 is made of a plurality of lens elements 201. Lens array 102 and 103 can be spherical or aspherical. Conventionally, lens elements 201 are of rectangular shape and cover the entire inner area of lens 102 with very little to no spaces between the lens elements. The lens 102 may have an array of lenses 201 covering only one side of a single plate, or covering both sides of a single plate. FIG. 2B shows a lens with lens elements 201 on only one side 260 and no lens elements on the other side 270. FIG. 2C shows lens elements 201 on side 260 and side 280. In the case of a single-sided plate, two lens plates 102 and 103 shown in FIG. 1 are used so a pair of matching lens elements 201 are created along the axis at a spacing essentially equal to the focal length of the lens element 201. In the case of a double-sided plate as shown in FIG. 2C, the pair of matching lenses 201 are spaced appropriately by the thickness of the plate. In the light processing system 100 of FIG. 1, each lens element pair 201 accepts light from light source 101 reflected off of mirror 108 and magnifies the light through it to encompass the entire active area 110 of the digital micromirror device 105. In this way, the lens array is used to redistribute the light source 101 uniformly across the surface of the active area 110 of the DMD.

Figure 3:
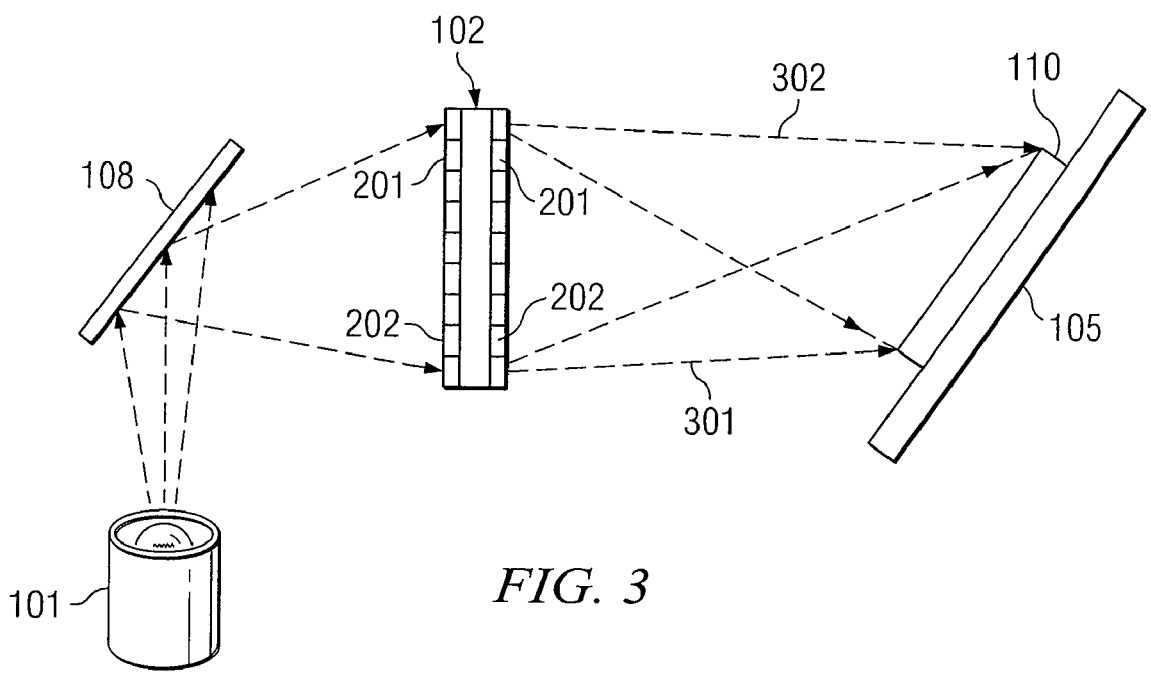
FIG. 3 illustrates a configuration of digital light processing system wherein the light from individual lens elements is illustrated as the light projects onto a DMD.

In reference to FIG. 3, FIG. 3 illustrates a portion of light processing system 100 showing the magnification of lens element pairs 201 and 202 onto the active area 110 of DMD 105. In this example, lens 102 includes lens elements on both sides, forming pairs 201 and 202. Light from light source 101 is directed to mirror 108. Mirror 108 directs the light from light source 101 through the lens 102. The light is directed through lens element pairs 201 and 202 in lens 102. FIG. 3 shows the behavior of light as the light is directed through two example lens element pairs 201 and 202 of lens array 102. Item 302 shows the magnification of a light beam through a single pair of lens element 201 onto DMD 105. Item 301 likewise shows the magnification from a different lens element pair 202. The plane of the DMD 105 is tilted relative to the plane of lens 102. DMD 105 is shown to be at a tilt angle from lens 102 so that light can be reflected away from DMD 105 and onto a prism to direct light to create an image on a screen.

Figure 4:
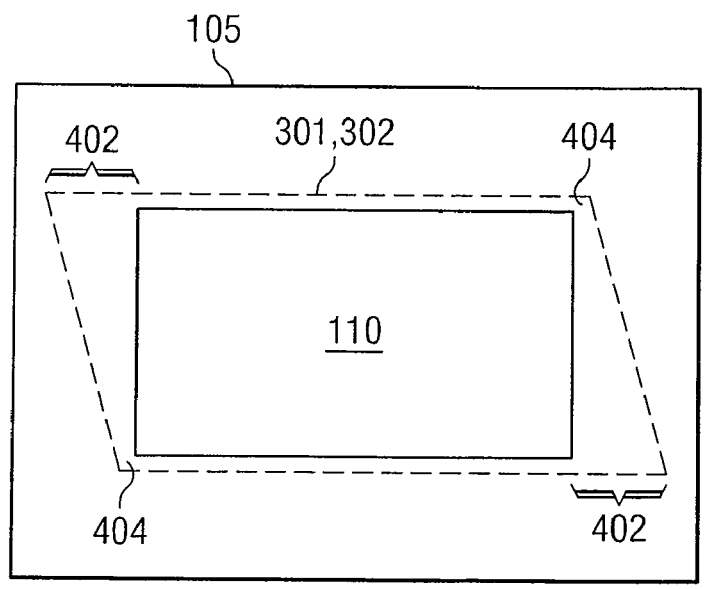
FIG. 4 illustrates a front view of a DMD as distorted light is projected on the DMD.

In reference to FIG. 4, FIG. 4 shows the surface of DMD 105 as light from the system of 100 in FIG. 1 using the lens array 102 shown in FIG. 2 is projected onto it. Because of the DMD's 105 angle relative to the lens 102, the light image projected onto the DMD as shown in item 301 and 302 is distorted and can be a different shape than the active area 110 of the DMD 105, in this case substantially a parallelogram. Because the light cast through the lens elements 201 is distorted into the shape of a parallelogram, it is required that the light projected through lens 201 be larger than the size of the active area 110 of the DMD 105 so that the entire DMD's active area 110 will receive light uniformly to form an image.

This overprojection is sometimes achieved by increasing the size of lens elements 201. The result is that unusable light area 402 is created.

The practice of oversizing the light projected by lenses 201 in the lens array so that the light occupies an area larger than the active area of the DMD is called overfill, shown by item 402 in FIG. 4. The overfill light becomes an increasingly large percentage of the usable light as the DMD diagonals are reduced in size. Overfill light is lost due to etendue expansion and does not contribute to screen brightness and reduces system efficiency. In some systems, in particular 0.17 inch diagonal systems, up to 67% of available light can be lost. One approach to correcting this problem is to reduce the size of the lens elements 201 to focus more light onto the active area 401 of the DMD 105. However, reducing the lens element 201 size causes a reduction in brightness of two image corners along one diagonal relative to the two other corners along the other diagonal, as less light is available on these corners. These image corners are labeled 404 in FIG. 4.

Figure 5:
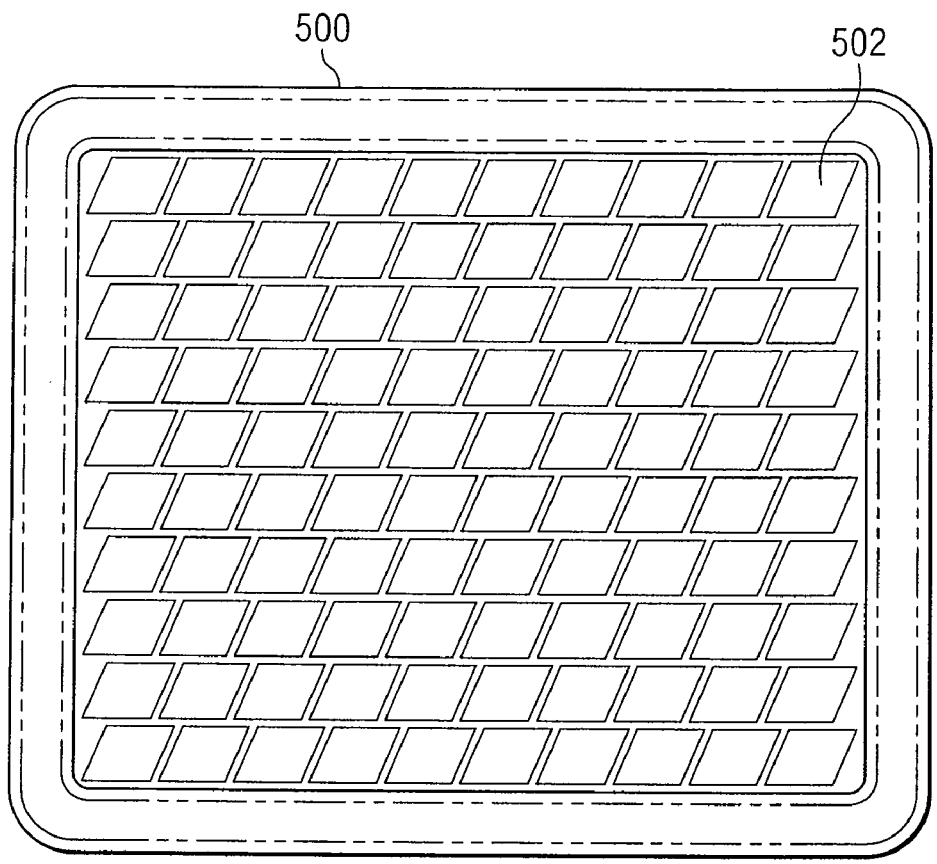
FIG. 5 illustrates an example configuration of a lens array with lens elements for predistorting light.

According to one embodiment, shown in FIG. 5, the lens elements 502, instead of being rectangular in shape as shown by element 201 in FIG. 2, are parallelograms. These parallelograms are in substantially the same shape as the parallelogram 301 and 302 shown in FIG. 4 that are created by the rectangular lens elements 201. The parallelogram 502 form a tessellation across the lens surface. Shaping the lens elements in this way "predistorts" the light as it exits the lens elements. For instance, in reference to FIG. 3, replacing lens 102 with the lens 500 shown in FIG. 5 creates a predistorted light projection onto the active area of the DMD. The predistortion of the lens 502 is also an etendue expansion, but it occurs at the collection end of the illumination system rather than at the DMD end, so that light collected by the lens elements 502 is not lost because it is not imaged onto the non-active overfill area of the DMD 105. The shape of the parallelogram is determined by optical modeling tools, which can be used to determine the shape of the parallelogram that is imaged onto the DMD from a rectangular lens 201. Then that shape is introduced back into the shape of the lens element 502 until the image is essentially corrected to be rectangular at the DMD.

Figure 6:
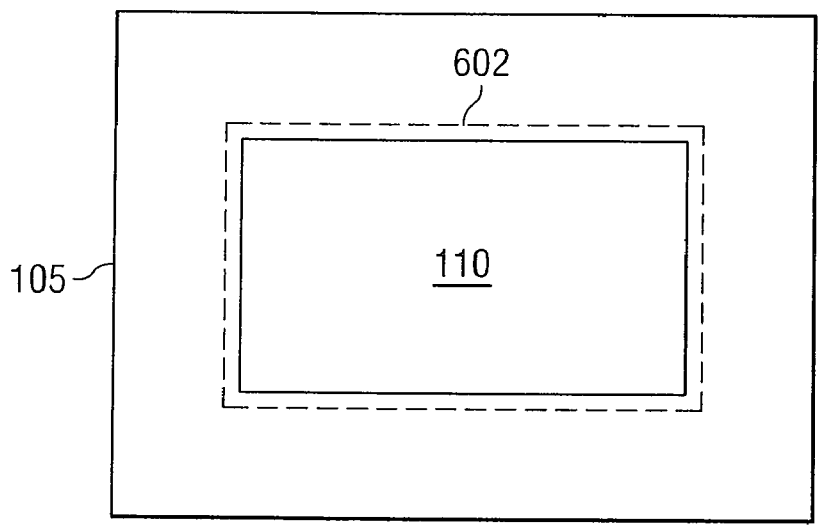
FIG. 6 illustrates a front view of a DMD as predistorted light is projected on the DMD.

As shown in FIG. 6, the predistorted light acts such that the shape of the light on the plane of the DMD is essentially the same shape as the active area of the DMD. As a result, using a predistorted lens element 502 in the shape of the parallelogram 301 and 302 of the distorted light caused when using lens 102 creates a rectangular light shape onto DMD 105. In this manner less overfill is required to cover the entire active area of the DMD and less light is wasted. This results in efficiency gains.

In reference to FIG. 6, the projection of light using lens array 500 in the system of FIG. 3 is shown. FIG. 6 shows DMD 105 as light is being projected on it in the system of FIG. 3. Area 110 shows the active area of DMD 105. 602 shows the shape of the light projected onto DMD 105 from lens 500 with the parallelogram shaped lens elements 502. As can be seen in FIG. 6, the shape of the light as projected onto DMD on the plane of the DMD is substantially rectangular and is substantially the same shape and size as the active area 110 of the DMD 105. In this way, the overfill areas 402 as shown in FIG. 4 are absent or substantially reduced. As a result, the projected light image onto DMD 105 using lens 500 is not required to be as large as that using 102 resulting in less overfill and less wasted light. The system of FIG. 3 and FIG. 1 using lens array 500 as shown in FIG. 5 results in a more efficient digital light processing system. It should be noted that the shape of the lens elements in FIG. 5 of the parallelogram is but one example of a predistortion technique that can be used to make more efficient use of the lighting available in a digital light processing system. In other embodiments where the angle between the digital micromirror device 105 and the lens array 102 is different than as shown in FIG. 1 and FIG. 3, the shape of the distortion of light from lens array 102 on the plane of DMD 105 may be different and may not be a parallelogram. In such instances, the shape of the lens elements on the lens array that is required to create a predistorted light source and an undistorted light image on the plane of the DMD may not be a parallelogram. In this case, the lens elements may be whatever shape the distorted light arriving at the DMD takes the shape of. The lens elements could be a different shape that forms a tessellation across the lens array with little to no space between lens elements, to avoid any additional loss of light. The shape of the lens elements may be cylindrical instead of spherical, for example, creating a lenticular array instead of a mosaic array, but the lenticular array may be distorted in a similar manner.

In addition, FIG. 1 shows two lens arrays 102 and 103 used between light source 101 and DMD 105. In one embodiment of the present invention, one lens array may comprise a standard lens array 102 with standard shape lens array elements 201 while the other lens array would include a predistorted lens with predistorted lens elements as described above. The predistorted lens elements must be nearest the light source in that case. In another embodiment, both lenses may be lens arrays with predistorted lens elements, as described above.

The lenses of the present invention may employ all, some, or none of the features or components discussed and illustrated in FIGS. 1-6.

Numerous other changes, substitutions, variations, alterations, and modifications may be ascertained to one skilled in the art and it is intended that the present invention encompass all such changes, substitutions, variations, alterations, and modifications as falling within the scope of the appended claims. For example, it will be understood that although a particular embodiment may show parallelogram shaped lens elements, other shapes may be used for predistorting light directed on.

What is claimed is:

1. A digital light processing apparatus, comprising:
   a light source;
   a digital micromirror device (DMD) including a rectangular array of micromirrors arranged in a DMD plane; and
   a lenticular lens assembly comprising a plurality of lens elements arranged in a rectangular array in a lens plane and located between said light source and said DMD with the DMD plane tilted relative to the lens plane, the lens elements each having a non-rectangular geometric configuration in the lens plane dimensioned and positioned to direct light from the light source to form a rectangular illumination pattern covering the array of micromirrors on the DMD plane.

2. The digital light processing apparatus of claim 1, wherein said geometric configuration of each lens element is substantially a parallelogram.

3. The digital light processing apparatus of claim 1, wherein said lens assembly comprises first and second axially-spaced lenticular lens surfaces and said lens elements are formed on one of said lens surfaces.

4. A digital light processing apparatus, comprising:
   a light source;
   a digital micromirror device (DMD); and
   a lens comprising a plurality of lens elements located between said light source and said DMD, the lens elements operable to direct light from the light source to the DMD at an angle that is not perpendicular to the DMD and further operable to compensate for skewing of light hitting the DMD due to the light being directed at a non-perpendicular angle by predistorting light from the light source;
   wherein the lens elements are predistorted so that the shape of the light directed by the lens elements is substantially the same shape as the active area of the DMD when the light reaches the active area of the DMD.

5. A method for directing light in a digital light processing apparatus, comprising:
   directing light from a light source toward a DMD through a lenticular lens assembly, the DMD including a rectangular array of micromirrors arranged in a DMD plane tilted relative to a plane of the lens assembly, and the lens assembly comprising a plurality of lens elements arranged in a rectangular array in the lens plane, each lens element having a non-rectangular geometric configuration in the lens plane dimensioned and positioned so that the directed light forms a rectangular illumination pattern covering the array of micromirrors on the DMD plane.

6. The method of claim 5, wherein the geometric configuration of each lens element is substantially a parallelogram.

7. A method for directing light onto a digital micromirror device, comprising the steps of:
   directing light toward a DMD through a lens comprising a plurality of lens elements such that, absent correction, the directed light is distorted at the DMD; and
   compensating for the distortion of the directed light at the DMD by predistorting, by the plurality of lens elements, said directed light prior to reaching the DMD;
   wherein distorting said light further comprises directing said light through said plurality of lens elements wherein the shape of said lens elements are substantially the same as the shape of the distorted light, absent correction, at the DMD.

8. A system for compensating for light distortion in a light processing system, comprising:
   a light source;
   a digital micromirror device (DMD) including a rectangular array of micromirrors arranged in a DMD plane; and
   a lenticular lens assembly directing light from the light source to the DMD, wherein said lens assembly comprises a plurality of lens elements arranged in a rectangular array in a lens plane, the DMD plane is tilted relative to the lens plane, and wherein each lens element has a non-rectangular geometric configuration in the lens plane and directs light to form a rectangular illumination pattern covering the array of micromirrors on the DMD plane.

9. The system of claim 8, wherein the geometric configuration of the lens elements is substantially a parallelogram.

10. The system of claim 8, wherein said lens assembly comprises first and second axially-spaced lenticular lens surfaces and said lens elements are formed on one of said lens surfaces.

11. A system for compensating for light distortion in a light processing system comprising:
   a light source;
   a digital micromirror device; and
   a lens directing light from the light source to the DMD wherein said lens comprises a plurality of lens elements, and wherein each lens element directs light onto the active area of the digital micromirror device in substantially the same shape as the active area of the digital micromirror device;

wherein said plurality of lens elements are on a first and a second surface of said lens; and wherein said plurality of lens elements on said first and second surface direct form pairs of lens elements that direct light onto the active area of the digital micromirror device in substantially the same shape as the active area of the digital micromirror device.

* * * * *